US010345160B2

(12) United States Patent
Monedero Miranda et al.

(10) Patent No.: US 10,345,160 B2
(45) Date of Patent: Jul. 9, 2019

(54) METHOD FOR OPTIMIZING THE DESIGN OF A DEVICE COMPRISING INTERROGATION MEANS AND A REMOTELY-INTERROGATABLE PASSIVE SENSOR

(71) Applicant: SENSEOR, Valbonne (FR)

(72) Inventors: Manuel Monedero Miranda, Antibes (FR); Luc Chommeloux, Mouans Sartoux (FR)

(73) Assignee: SENSEOR, Valbonne (FR)

( * ) Notice: Subject to any disclaimer, the term of this patent is extended or adjusted under 35 U.S.C. 154(b) by 0 days.

(21) Appl. No.: 15/983,966

(22) Filed: May 18, 2018

(65) Prior Publication Data

US 2018/0335350 A1     Nov. 22, 2018

(30) Foreign Application Priority Data

May 19, 2017  (FR) ..................................... 17 54475

(51) Int. Cl.
*G01K 11/26*  (2006.01)
*G01K 1/02*   (2006.01)
(Continued)

(52) U.S. Cl.
CPC ............. *G01K 11/265* (2013.01); *G01D 5/48* (2013.01); *G01K 1/024* (2013.01); *G01K 7/32* (2013.01);
(Continued)

(58) Field of Classification Search
CPC ........ G01K 11/265; G01K 1/024; G01K 7/32; G08C 17/02; H01Q 1/2216; G01L 1/165
See application file for complete search history.

(56) References Cited

U.S. PATENT DOCUMENTS 6,823,717 B2 *  11/2004  Porter .................. G01N 29/022
                                              73/29.05
6,964,518 B1    11/2005  Jagtoeyen
(Continued)

FOREIGN PATENT DOCUMENTS

DE    10 2009 056060 A1    3/2011
EP         2 878 946 A1    6/2015
(Continued)

*Primary Examiner* — Brian E Miller
(74) *Attorney, Agent, or Firm* — Baker & Hostetler LLP

(57) ABSTRACT

A method for optimizing the design of a device includes interrogation means and a differential passive sensor, including a generator connected directly or indirectly to a reader antenna, a passive sensor including at least two resonators, a sensor antenna connected to the sensor. The method includes determining a set of curves $P_{SAW}$ as a function of the frequency of interrogation of the sensor, each curve being defined for a given impedance $Z_T$ representing the impedance of the Thevenin equivalent generator dependent on the impedance of the reader antenna, on the impedance of the sensor antenna and on the coupling between the two antennas, for a given sensor impedance $Z_{SAW}$; selecting at least one curve $P_{SAW}$ from the set of predefined curves meeting two criteria: exhibiting two frequency peaks representative of a coherent differential sensor behavior; having a width at mid-height of the two the peaks below a threshold value; and determining the sensor antenna exhibiting the sensor antenna impedance correlated to the curve $P_{SAW}$ selected for the predefined SAW sensor.

7 Claims, 9 Drawing Sheets

(51) Int. Cl.
*G08C 17/02* (2006.01)
*G01K 7/32* (2006.01)
*G01L 1/16* (2006.01)
*H01Q 1/22* (2006.01)
*G01L 9/00* (2006.01)
*G01D 5/48* (2006.01)

(52) U.S. Cl.
CPC ............ G01L 1/165 (2013.01); G01L 9/0025 (2013.01); G08C 17/02 (2013.01); H01Q 1/2216 (2013.01)

(56) References Cited

U.S. PATENT DOCUMENTS

| | | | | |
|---|---|---|---|---|
| 7,891,252 | B2* | 2/2011 | Cobianu | B60C 23/0408 310/324 |
| 8,299,679 | B2* | 10/2012 | Chommeloux | G01L 9/0025 310/313 B |
| 8,317,392 | B2* | 11/2012 | Cobianu | H03H 9/02535 310/313 B |
| 8,372,674 | B2* | 2/2013 | Cobianu | B81C 1/00206 438/49 |
| 8,479,590 | B2* | 7/2013 | Cobianu | G01N 29/223 73/801 |
| 9,027,407 | B2* | 5/2015 | Chommeloux | G01L 9/0025 73/702 |
| 9,435,768 | B2* | 9/2016 | Ballandras | G01N 29/22 |
| 2007/0114889 | A1 | 5/2007 | Cobianu et al. | |
| 2008/0259995 | A1 | 10/2008 | Kuhn | |
| 2012/0143559 | A1 | 6/2012 | Wall et al. | |
| 2013/0218498 | A1* | 8/2013 | Droit | G01D 5/48 702/79 |
| 2014/0319964 | A1* | 10/2014 | Andle | H03H 9/02551 310/313 A |

FOREIGN PATENT DOCUMENTS

| | | |
|---|---|---|
| WO | 2008/037547 | 4/2008 |
| WO | 2016/019754 A1 | 2/2016 |

* cited by examiner

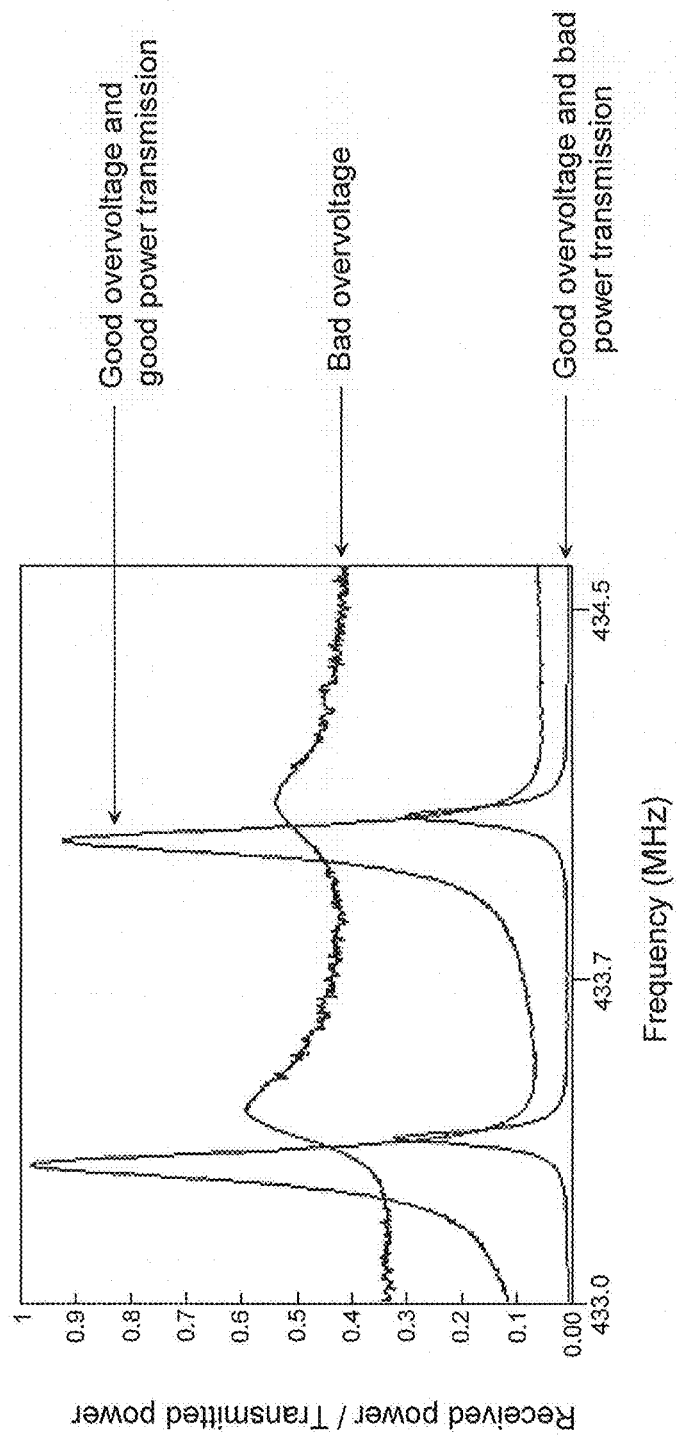

METHOD FOR OPTIMIZING THE DESIGN OF A DEVICE COMPRISING INTERROGATION MEANS AND A REMOTELY-INTERROGATABLE PASSIVE SENSOR

CROSS-REFERENCE TO RELATED APPLICATIONS

This application claims priority to foreign French patent application No. FR 1754475, filed on May 19, 2017, the disclosure of which is incorporated by reference in its entirety.

FIELD OF THE INVENTION

The field of the invention is that of the devices comprising interrogation means and a remotely-interrogated passive sensor, the sensor being based on resonator(s) and being able to be a temperature sensor or a strain/deformation sensor, that can be interrogated using a radiofrequency signal in applications where the sensor can be mobile.

BACKGROUND

In the case of the temperature measurement, that can be a surface or else internal (volume) temperature measurement. One well known example is the measurement of temperature using passive surface wave piezoelectric sensors, commonly called SAW (Surface Acoustic Wave) sensor. FIG. 1 illustrates the surface of a solid in the presence of a conventional surface acoustic wave: Rayleigh wave.

These sensors are for example composed of resonators operating in frequency bands ranging from 430 to 450 MHz and generally using a quartz substrate making it possible to achieve high quality factors (product Q*f of the order of $6*10^{12}$).

A surface wave resonator is composed of metal electrodes, deposited by standard photolithography methods in microelectronics, on the surface of a piezoelectric substrate. FIG. 2 illustrates the electrodes of an SAW resonator seen in cross section in the sagittal plane in the presence of a surface wave.

The structure of a surface wave resonator is an electroacoustic transducer T with interdigital combs surrounded on either side by Bragg mirrors M1 and M2. FIG. 3 illustrates the electrodes of a surface wave resonator seen from above.

At the resonance frequency, the condition of synchronism between the reflectors is satisfied making it possible to obtain a coherent addition of the different reflections which occur under the reflectors. A maximum of acoustic energy is then observed within the resonant cavity and, from an electrical point of view, a maximum of amplitude of the current admitted by the transducer is observed. The electrical conductance (real part of the admittance which, multiplied by the voltage, gives the current), a function of the frequency, therefore admixed, at the resonance frequency, a maximum as illustrated in FIG. 4.

When connected to an antenna, the resonators can be interrogated via electromagnetic waves, that is to say that it is possible to determine their resonance frequency. For that, an interrogation method is used that is close to that of RADAR as illustrated in FIG. 5.

An electromagnetic pulse of sufficient duration is transmitted at a frequency F0 and forces the resonator to oscillate at this frequency, and this is the so-called "transmission" phase. The closer the transmitted frequency is to the resonance frequency of the resonator (condition of synchronism in the Bragg mirrors), the more energy the resonator accumulates in the acoustic cavity. For the duration of the transmitted pulse, the resonator is charged, accumulating energy. Then, after a brief transient state, the resonator is discharged into the antenna which is connected to it, transmitting a decreasing exponential at its natural oscillation frequency Fr, that is to say at the resonance frequency. The received power of the decreasing exponential is then measured, and this is the so-called "reception" phase. The complete operation is repeated by varying the interrogation frequency F0 and the maximum power measured or estimated corresponds to the resonance frequency. This resonance frequency depends in particular on the temperature and on the strain to which the SAW device is subjected.

So as to be free of certain RF disturbances (distance between the sensor and the transmission antenna in particular) and of certain problems due to the aging of the sensor (drift of the frequencies over time for example), the latter is generally composed of a minimum of two resonators. That makes it possible to use the frequency difference between the two resonators to calculate the physical quantity measured, such as the temperature for example.

A certain number of works have already been carried out in the field of temperature measurement on moving objects.

For example, the patent U.S. Pat. No. 6,964,518 describes a device of glove finger type for measuring temperature inside a moving mechanical part. According to this patent, the temperature sensor contains an element sensitive to surface acoustic waves, commonly called SAW, exhibiting a transfer function dependent on the temperature. The proposed solution is of delay line type. One of the drawbacks with this type of solution is the maximum interrogation distance (defined as the distance between the antenna associated with the sensor and the antenna associated with the reader) which is less (in the context of compliance with the standards) than the distances accessible in the case of sensitive elements of resonator type. This last point in particular makes it difficult to interrogate several sensors with a single interrogation antenna.

The patent US2008259995 describes a temperature probe for domestic application which also incorporates a single sensitive element, but one that is of resonator type. The probe can be used to measure the internal temperature of food while being baked in an oven for example. In this case also, the position of the sensor in relation to its environment will be variable from one bake to another. Nevertheless, the use of a single resonator makes the measurement of the temperature sensitive to the frequency pulling effect due to the variation of the impedance of the antenna connected to the SAW sensor (for example linked to the relative movement of the antenna in a metal environment).

It should also be noted that the use of a single resonator does not make it possible to be free of the dependency of the temperature measurement on the drift of the local oscillator with which the reader is equipped.

For the same type of domestic application, the patent US20120143559 teaches a system which comprises a passive probe with a temperature sensor which comprises two resonators. This differential structure, subject to observing certain maximum deviations between the values of the elements of the equivalent circuits of BVD (Butterworth-Van Dyke equivalent model) type of each of the two resonators, theoretically makes it possible to have a temperature measurement independent of the position of the temperature probe in the oven. It has been found that if certain precautions are not taken in the design of the antenna connected to the sensor, an aberrant temperature measurement can nevertheless still occur.

It is recalled hereinbelow that the frequency response of a single-port resonator of SAW resonator type can be modelled using a Butterworth-Van Dyke (BVD) equivalent model as illustrated in FIG. 6 using motional elements Rm, Lm, Cm, and a static capacitor Co.

FIGS. 7a and 7b present the measurement-BVD model superposition for the real and imaginary parts of the impedance of an SAW sensitive element comprising two resonators meeting the conditions given in the patent application DE102009056060 A1.

The values of the parameters R, L, C, $C_0$ of this differential sensor are as follows:

R1=36.75Ω, L1=181.84 μH, C1=0.74 fF
R2=37.75Ω, L2=197.45 μH, C2=0.68 fF
$C_0$=5 pF

In this patent application, it is taught that, to minimize the frequency pulling, it is best to have variations ΔR, ΔL and ΔC below threshold values.

Nevertheless, and generally, there is no single unique impedance matching condition between the antenna and the SAW sensor, but an infinity thereof. In most of the applications (industrial, domestic), the antennas (reader and sensor) are located in near field or else in environments where a coupling between the antennas exists. The impedance seen by the SAW sensor is therefore, in these conditions, a function of the impedance of the reader antenna, of the antenna which is directly connected to it and of the coupling between these two antennas.

FIG. 8 illustrates the equivalent circuit seen at the terminals of the SAW sensor connected to a sensor antenna coupled to a reader antenna, in the case of the sensor comprising two resonators.

Maximizing the transfer of energy to the SAW sensor (and therefore maximizing the interrogation distance) amounts to maximizing the power $P_{SAW}$ dissipated in the SAW sensor with $P_{SAW}$ corresponding to the received power/transmitted power ratio and defined as follows:

$$P_{SAW}(\omega, Z_T(\omega)) = \frac{1}{2}\left|\frac{E_T(\omega)}{Z_T(\omega) + Z_{SAW}(\omega)}\right| Re(Z_{SAW}(\omega)) \quad \text{Equation (1)}$$

in which:
- $E_T(\omega)$ represents the electromotive force of the Thevenin equivalent generator which depends in particular on the impedance of the reader antenna and on the coupling between the two antennas;
- $Z_T(\omega)$ represents the impedance of the Thevenin equivalent generator which depends in particular on the impedance of the sensor antenna, of the reader antenna and of the coupling between the two antennas;
- $Z_{SAW}(\omega)$ is the impedance of the sensor;
- $\omega=2\pi f$ is the pulsing with f for frequency.

According to the equivalent circuit of FIG. 8, it is therefore the equivalent impedance seen by the SAW sensor which has to fulfil the impedance matching condition (maximization of transmitted power in $Z_{SAW}$).

The Applicant has studied the trend of the power $P_{saw}$ as a function of the frequency (x axis) and of the conjugate imaginary part of $Z_T$ (y axis) for a real part of $Z_T$ of 5Ω with the sensor with two resonators bearing out the criteria of the patent DE102009056060 A1 cited previously. The results are reported in FIG. 9.

Through this example, it can be seen that, in the case where the real part of $Z_T$ is low (5Ω), a good link budget is obtained overall. Indeed, in this case, the maximum value of $P_{SAW}$ is close to 0 dB (vertical scale in grey levels).

It is nevertheless observed in this case that, depending on the value of the imaginary part of $Z_T$, it is possible to obtain: an acceptable measurement of both resonances (case where Im $(Z_T)^*$=25Ω for example).

On the other hand, for a value of Im $(Z_T)^*$=−68Ω, the differential measurement is no longer possible because the frequency response of the differential sensor is then reduced to a single peak and the result of its operation leads to an aberrant temperature. This is an extreme case of frequency pulling where the temperature measurement is impossible.

These two cases appear clearly in FIG. 10 which presents the curves in two dimensions associated with these two particular cases:
- the curve (a) relates to the frequency response of the SAW differential sensor with Re($Z_T$), Im($Z_T$)~(5, −25);
- the curve (b) relates to the frequency response of the differential sensor with Re($Z_T$), Im($Z_T$)~(5, 68).

It is therefore essential not to have environment parameters resulting in aberrant measurements.

And in all these cases however, the metal environment in particular around the antenna associated with the sensor must be taken into account because it generates a dependency on the impedance of the Thevenin equivalent generator and therefore a risk of being within a zone where the temperature measurement is aberrant.

The variations of parameters such as the magnetic permeability, the electrical permittivity or the electrical conductivity which generate variations $Z_T$ have an impact on the value of the parameter $P_{SAW}$.

It is therefore possible to reformulate the equation (1) as the equation (2) as follows:

$$P_{SAW}(\omega,\mu,\varepsilon,\sigma)=\frac{1}{2}[E_T(\omega,\mu,\varepsilon,\sigma)/(Z_T(\omega,\mu,\varepsilon,\sigma)+Z_{SAW}(\omega,\mu,\varepsilon,\sigma))]^2 Re(Z_{SAW}(\omega,\mu,\varepsilon,\sigma))] \quad (2)$$

SUMMARY OF THE INVENTION

The Applicant has notably observed that the variation of the equivalent impedance as a function of the abovementioned parameters (ω, μ, ε, σ), can generate prohibitive errors in estimation of the resonance frequencies of the SAW sensor.

The Applicant has found that it is possible to artificially generate a third resonance. This result can be obtained in particular in two ways:
- in a static configuration with an equivalent impedance exhibiting a significant variation in frequency (miniature antennas);
- in a dynamic configuration in which a metal plane disturbs the radiating element associated with the SAW sensor.

FIG. 11a illustrates the graphic representation of the conjugate of the imaginary part of $Z_T$ and of the imaginary part of the impedance of the differential sensor $Z_{SAW}$, and reveals the variation of Im ($Z_T$).

FIG. 11b illustrates an example of frequency response of a differential sensor in the case of a significant frequency variation of $Z_T$.

Consequently, even if the two resonators involved in the composition of a differential temperature sensor are matched such that, at a reference temperature, the resistance, the inductance and the motional capacitance between the two resonators are identical, a significant frequency pulling can be obtained if the antennas and the propagation medium are not incorporated in the design of the system together with their variations as a function of time and temperature. This pulling can generate aberrant temperature values that are incompatible with the accuracy demands.

A sensor based on two resonators therefore makes it possible to only partially minimize the problem of frequency pulling.

In this context, the Applicant studied, for the SAW sensor whose impedance is represented in FIG. 7, the variation of $P_{SAW}$ as a function of the frequency and of the imaginary part of $Z_T$ for two real values $Z_T$ equal to 50Ω and to 150Ω.

It is found, in relation to the preceding case where the real part of $Z_T$ is low (5Ω), that the zone which led to an aberrant temperature measurement, i.e. $Re(Z_T),Im(Z_T)\sim(5.68)$, is less pronounced, even non-existent. There is in fact a non-critical rise in $P_{SAW}$ noted between the two resonances for 50Ω and which is strongly attenuated, even non-existent for the 150Ω case.

FIGS. 12*a* and 12*b* thus show the trend of the imaginary part Im $(Z_T)^*$ as a function of the frequency in the ISM band respectively for an impedance $Z_T$=50Ω and an impedance $Z_T$=150Ω.

These findings suggest considering operating points corresponding to a higher real part of $Z_T$ to the detriment of a degraded range. Indeed, the maximum of $P_{SAW}$ in the case $Re(Z_T)$=5Ω is of the order of −13 dB whereas the latter changes to −23 dB in the case of $Re(Z_T)$=50Ω and to −28 dB in the case $Re(Z_T)$=150Ω.

This inventive approach based on the benefit of the trade-off between the signal level transmitted by the SAW sensor (which conditions the maximum interrogation distance) and the frequency pulling (which conditions the temperature measurement accuracy) led the Applicant to the optimization method that makes it possible to define the sensor antenna best suited to given environmental conditions.

More specifically, the subject of the present invention is a method for optimizing the design of a device comprising interrogation means and at least one differential passive sensor, comprising a generator connected directly or indirectly to a reader antenna, at least one passive sensor comprising at least two resonators, a sensor antenna connected to said sensor, characterized in that it comprises the following steps:
  the determination of a set of curves $P_{SAW}$ corresponding to the received power/transmitted power ratio as a function of the frequency of interrogation of the sensor, for a reader antenna and a set of sensor antennas;
  each curve $P_{SAW}$ being defined by a given impedance $Z_T$ representing the impedance of the Thevenin equivalent generator dependent on the impedance of the reader antenna, on the impedance of the sensor antenna and on the coupling between the two antennas, for a given sensor impedance $Z_{SAW}$;
  the selection of at least one curve $P_{SAW}$ from the set of predefined curves meeting two criteria:
    exhibiting two frequency peaks representative of a differential sensor;
    having a width at mid-height of the two said peaks below a threshold value;
  the determination of the sensor antenna exhibiting the sensor antenna impedance correlated to the curve $P_{SAW}$ selected for the predefined SAW sensor.

According to variants of the invention, the curves $P_{SAW}$ are determined by using a quadripole as matching circuit between the generator and the reader antenna, so as to increase the number of curves $P_{SAW}$ by varying the impedance of the reader antenna and the coupling between the reader antenna and the sensor antenna.

According to variants of the invention, the threshold value of the mid-height width is approximately 100 kHz.

According to variants of the invention, the resonators are acoustic resonators that can be surface wave resonators (SAW) or volume wave resonators (BAW).

According to variants of the invention, the resonators are dielectric resonators.

According to variants of the invention, the set of curves is generated for a set of operating temperatures of said device, the sensor being a temperature sensor.

According to variants of the invention, the sensor is a strain/deformation sensor.

BRIEF DESCRIPTION OF THE DRAWINGS

The invention will be better understood and other advantages will become apparent on reading the following description given in a nonlimiting manner and through the attached figures in which:

FIG. 13 illustrates examples of typical $P_{SAW}$ curves as a function of the frequency showing the satisfaction of the parameters required, according to the optimization method of the invention.

DETAILED DESCRIPTION

Figure 1:
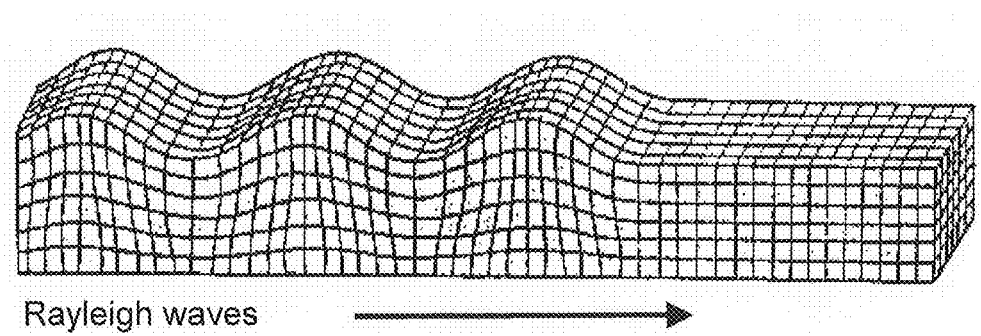
FIG. 1 illustrates the surface of a solid in the presence of a conventional surface acoustic wave: the Rayleigh wave.
Figure 2:
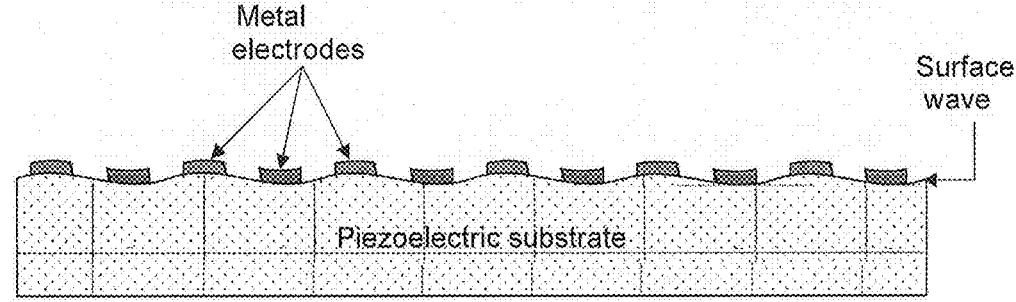
FIG. 2 illustrates the electrodes of an SAW resonator seen in cross section in the sagittal plane in the presence of a surface wave.
Figure 3:
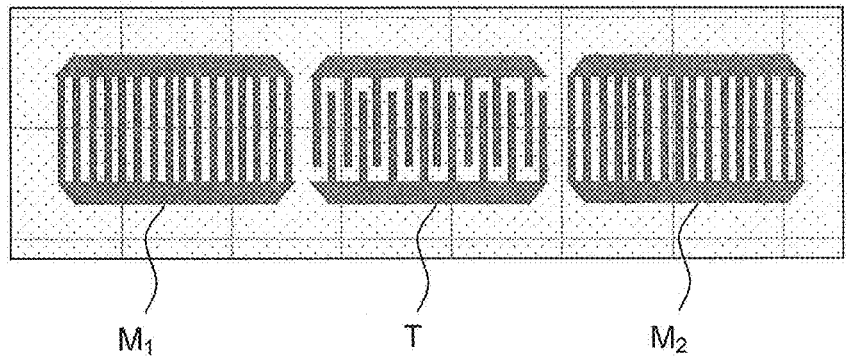
FIG. 3 illustrates the electrodes of a surface wave resonator seen from above.
Figure 4:
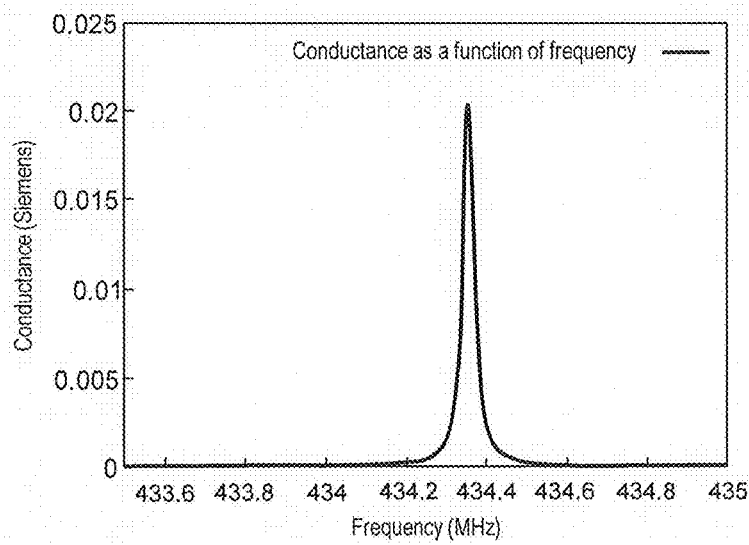
FIG. 4 illustrates the typical frequency response of an SAW resonator on quartz.
Figure 5:
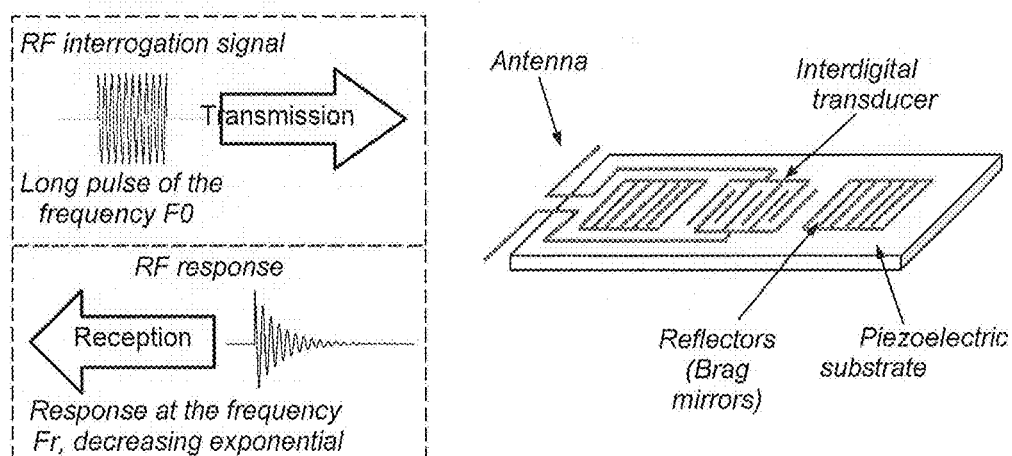
FIG. 5 illustrates the principle of RF interrogation of an SAW resonator.
Figure 6:
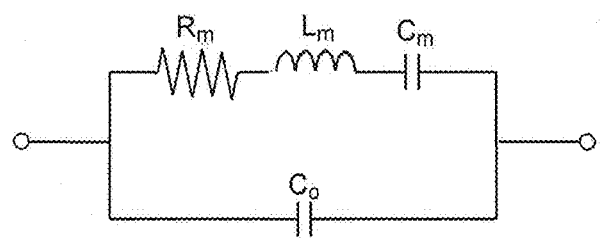
FIG. 6 illustrates the Butterworth-Van Dyke (BVD) electric model.
Figure 7A:
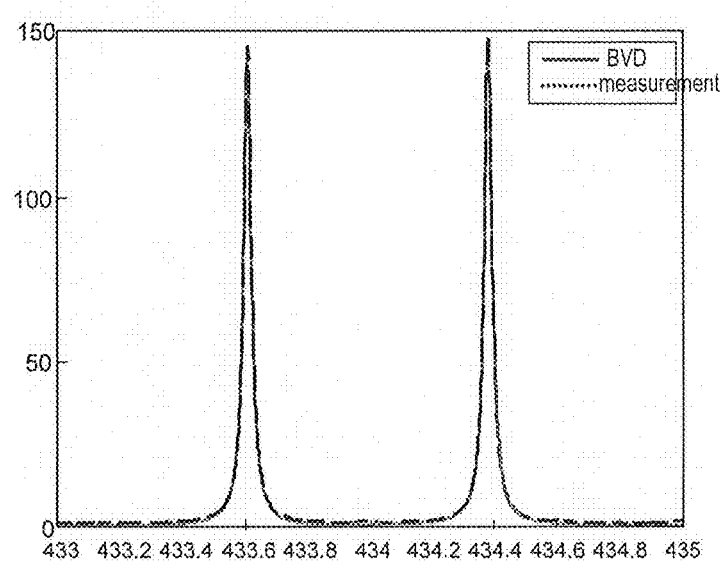
FIGS. 7*a* and 7*b* show the measurement-BVD model superposition for the real and imaginary parts of the impedance of an SAW sensitive element comprising two resonators meeting the conditions given in the patent DE102009056060 A1.
Figure 7B:
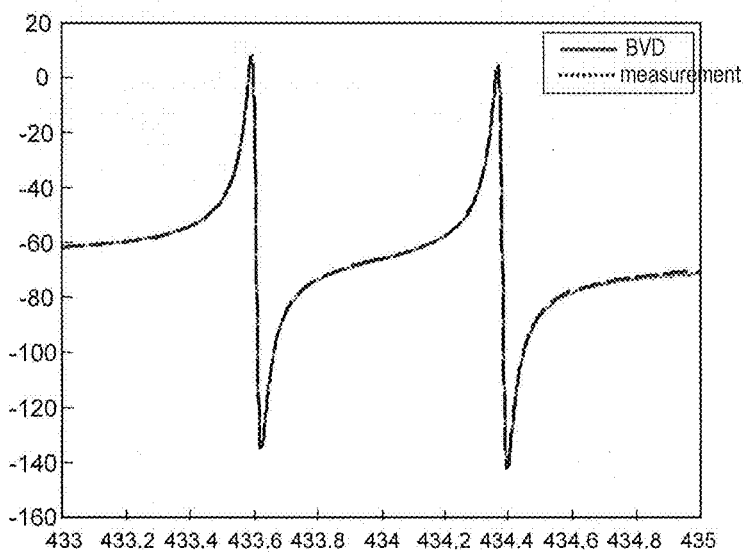
Figure 8:
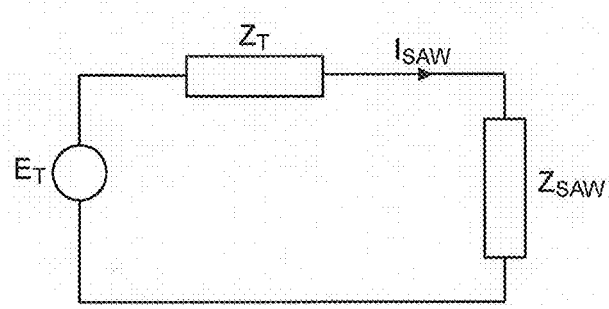
FIG. 8 illustrates the equivalent circuit seen at the terminals of an SAW sensor connected to a sensor antenna coupled to a reader antenna.
Figure 9:
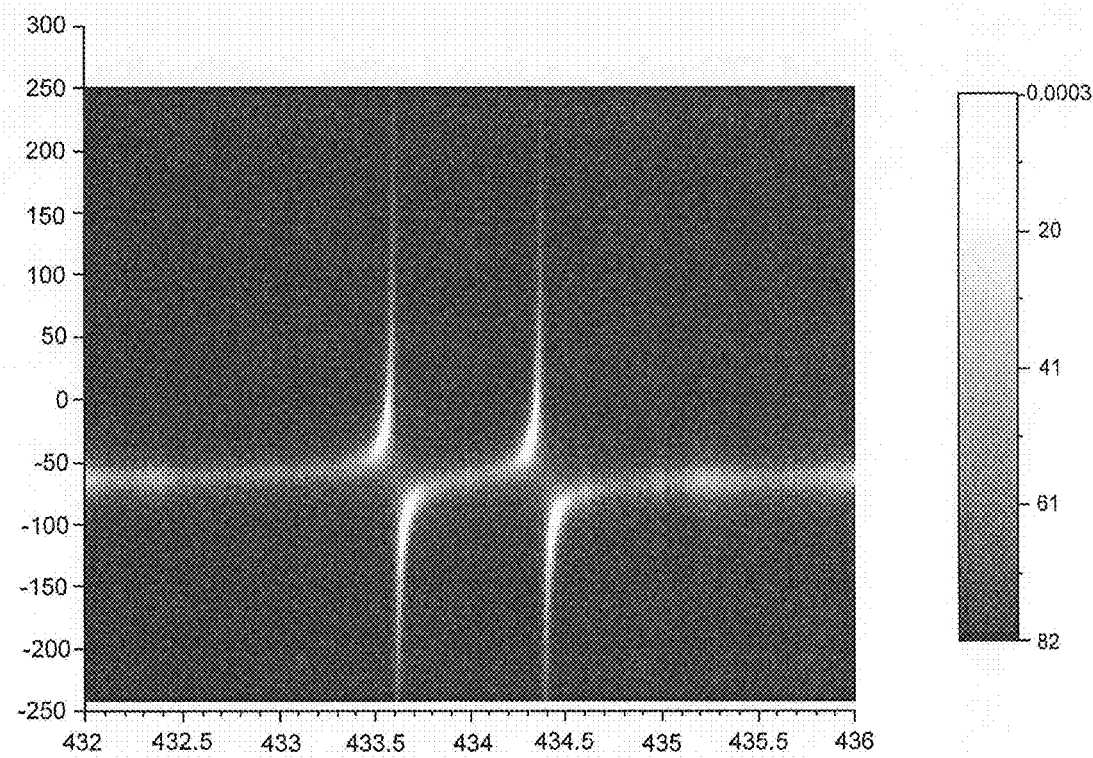
FIG. 9 illustrates the variation of $P_{SAW}$ (vertical axis dB) as a function of the frequency and of the imaginary part of $Z_T$ for a real part value of $Z_T$=5Ω.
Figure 10B:
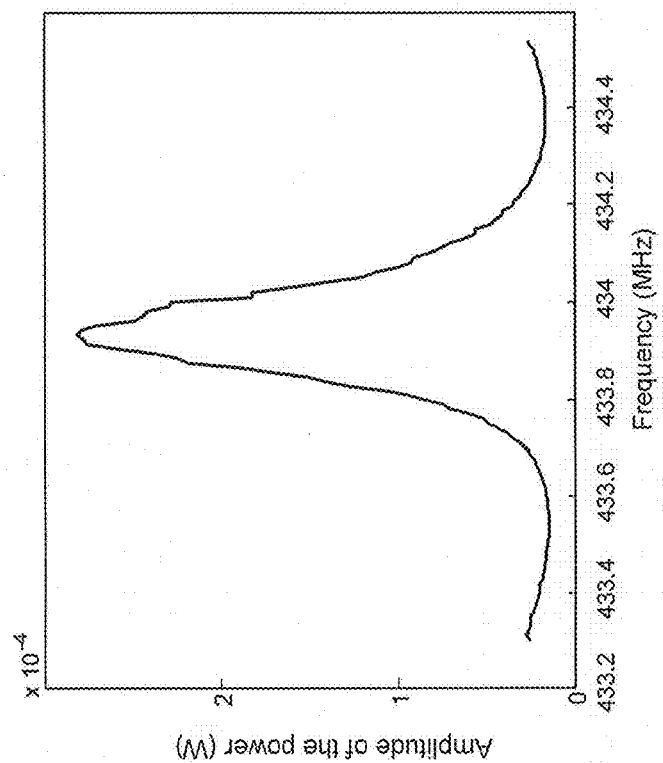
FIGS. 10*a* and 10*b* respectively illustrate the frequency responses associated with two acceptable antenna operating points and with an errored antenna operating point.
Figure 10A:
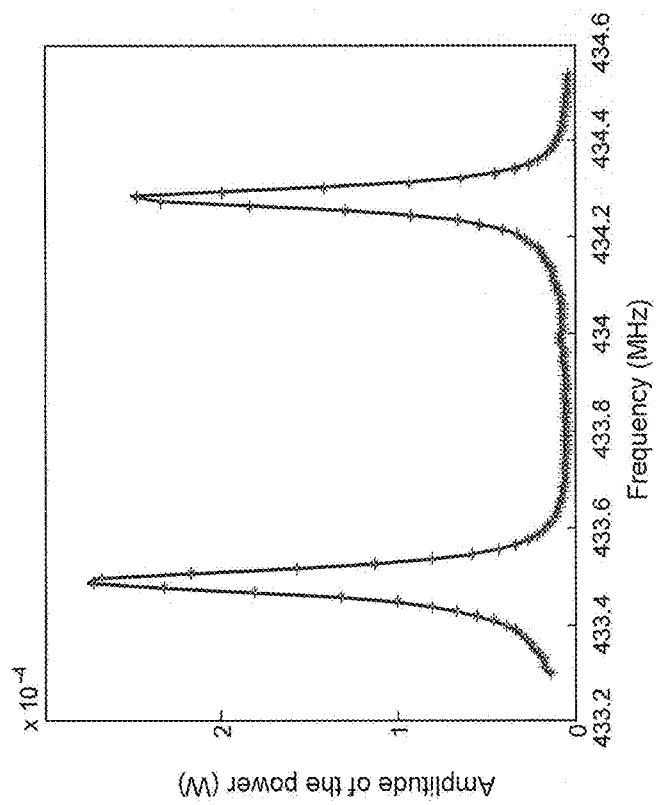
Figure 11B:
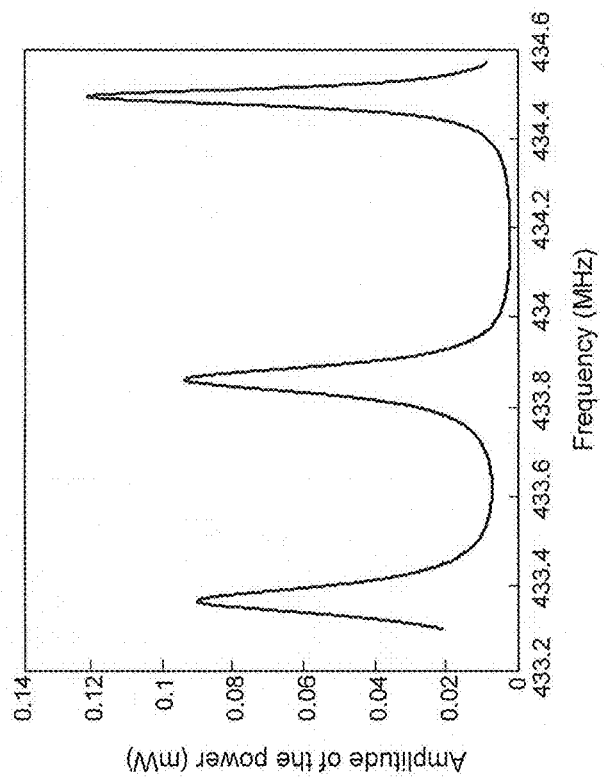
FIG. 11*b* illustrates an example of frequency response of a differential sensor in the case of a significant frequency variation of $Z_T$.
Figure 11A:
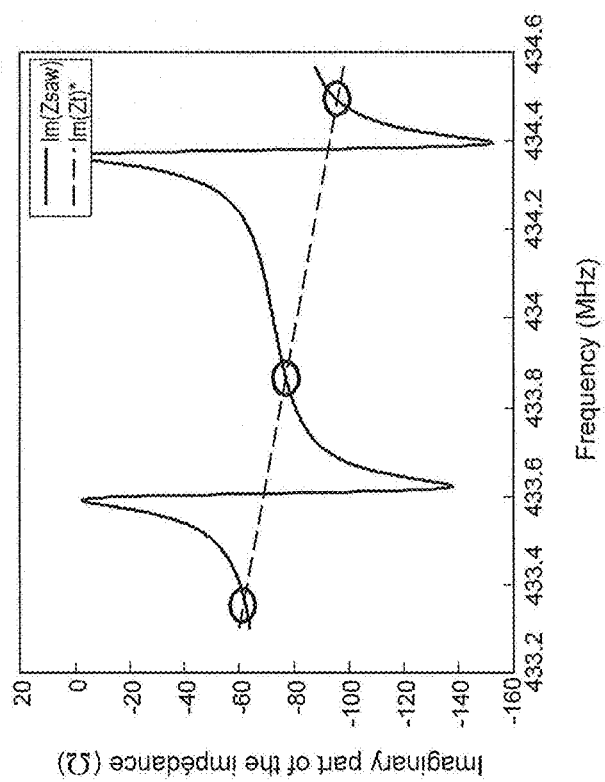
FIG. 11*a* illustrates the graphic representation of the conjugate of the imaginary part of $Z_T$ and of the imaginary part of the impedance of the differential sensor.
Figure 12A:
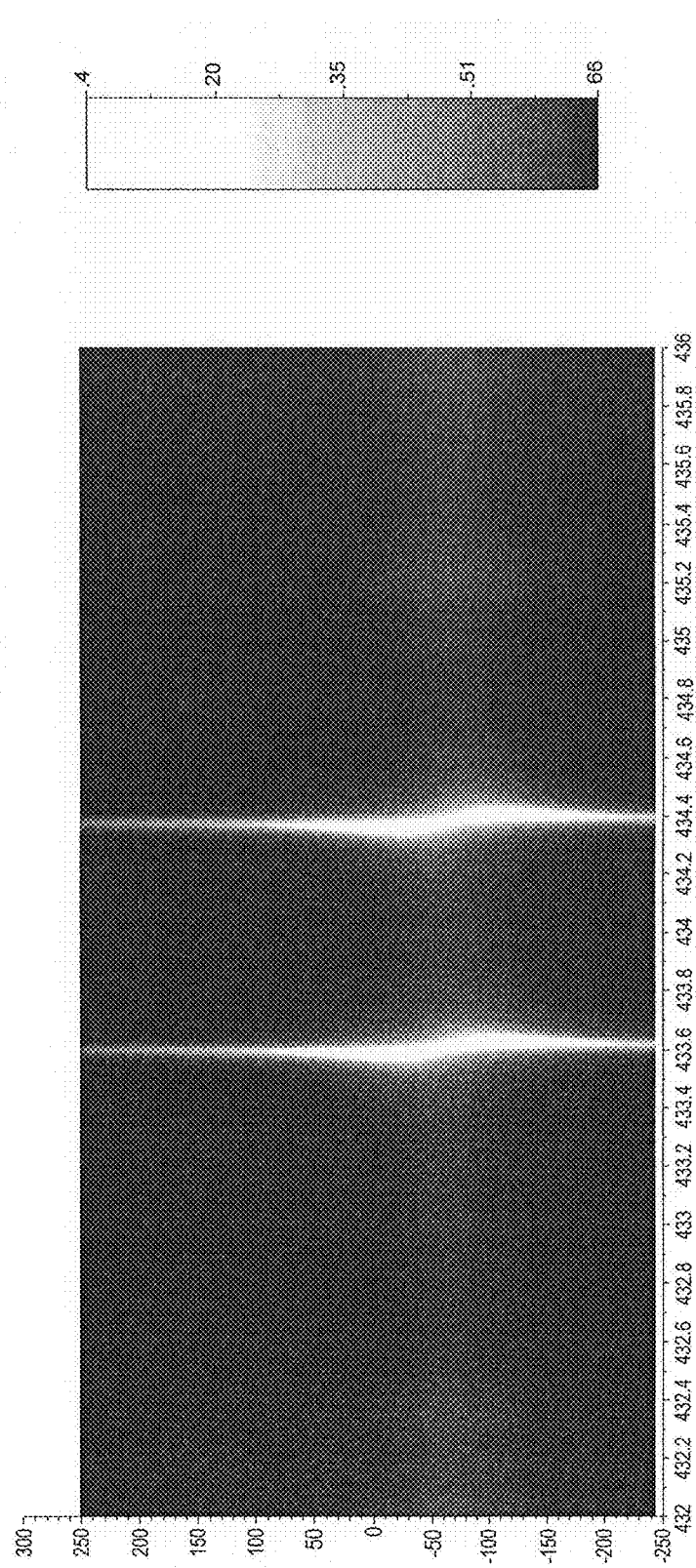
FIGS. 12*a* and 12*b* show the trend of the imaginary part Im $(Z_T)^*$ as a function of the frequency in the ISM band respectively for respectively an impedance $Z_T$=50Ω and an impedance $Z_T$=150Ω.
Figure 12B:
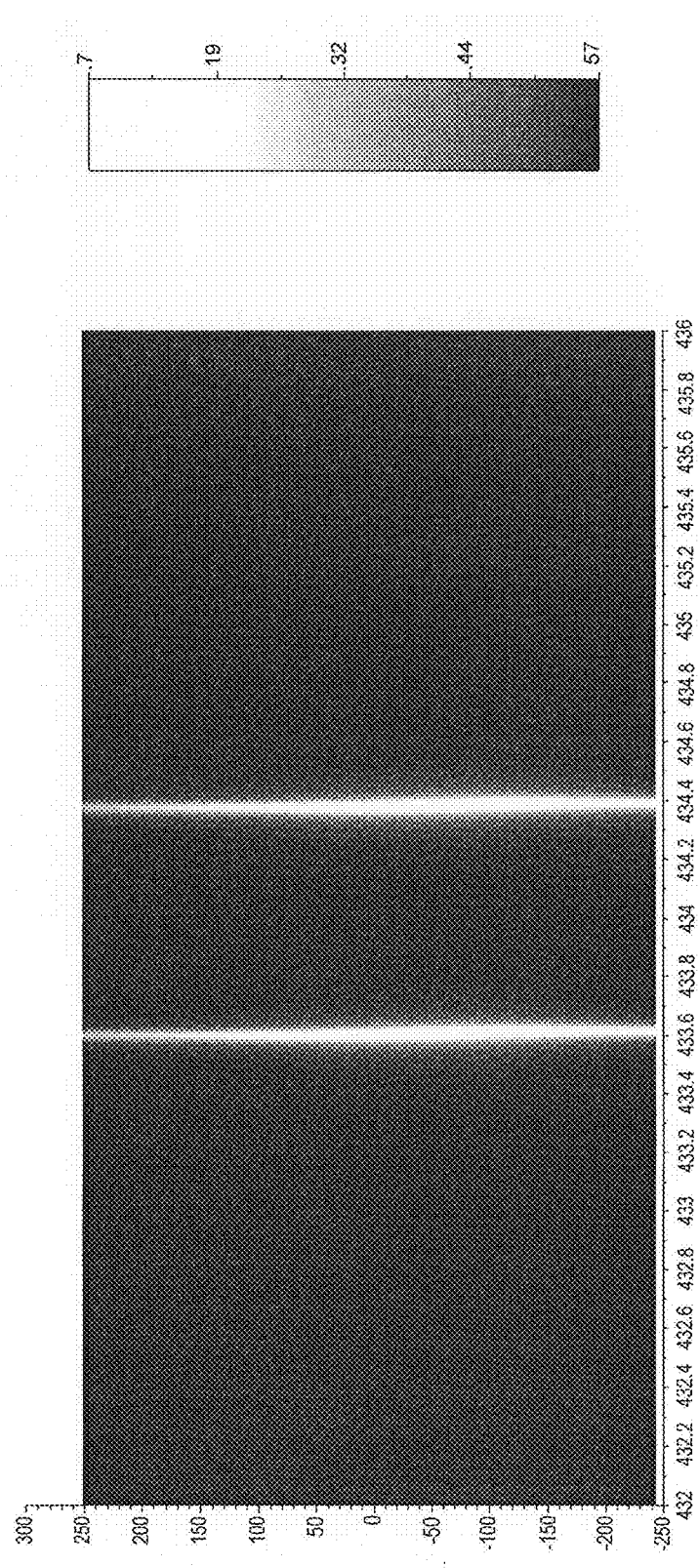

The optimization method comprises the following different steps in the context of a differential sensor, that can typically comprise two resonators with acoustic waves that can be surface waves (SAW). It should be noted that the sensor could also comprise volume acoustic wave resonators (BAW) or dielectric resonators.

Step 1:

The determination, for a given differential sensor, of its impedance $Z_{SAW}$.

Step 2:

The definition not simulation of a set of curves $P_{SAW}$ in a frequency band of interest for a reader antenna and a set of sensor antennas, that can for example be of dipole type.

Step 3:

The selection of the curve or curves which meet the following two criteria:
- exhibiting two frequency peaks representative of a coherent differential sensor behavior with maximum power peaks;
- having a width at mid-height of said two peaks below a threshold value, that can typically be less than or equal to 100 kHz.

FIG. 13 illustrates examples of curves that can be obtained with different sensor antenna values.

The curve 13a meets the selection criteria: a good overvoltage and a good power transmission;

The curve 13b presents: a bad overvoltage;

The curve 13c presents a good overvoltage and a bad power transmission.

It is thus possible, after having selected the subset of curves 13a and 13c, to ultimately select the curve 13a.

Example of method for optimizing a temperature probe comprising a differential sensor having two elastic wave resonators and that can typically be used in the metal walls of an oven.

The Applicant performed 21 acquisitions with antenna frequencies characteristic of the sensor antenna chosen.

These measurement points make it possible to define the antenna frequencies and therefore the antennas that make it possible to meet the optimization criteria defined in the present invention, i.e. a high power and a sufficiently small resonance peak width, characterized by a sufficiently high quality factor.

More specifically, Table 1 below provides 21 acquisitions performed for antennas associated with the sensors whose frequency lies, theoretically, between 300-500 MHz. More specifically, Table 1 lists, for a given curve PSAW correlated to a given antenna, the maximum powers of the two resonance peaks of the two resonators, their resonance frequencies (that can vary slightly, hence the benefit of performing differential measurements) and the widths at mid-height of the two resonance peaks reflected by the quality factors.

In Table 1:

Fr_antenna is the resonance frequency of the receiving antenna determined from the direct measurement of the antenna not charged by the SAW sensor;

Fr_reso1 and Fr_reso2 correspond to the frequencies calculated by the interrogation unit for the resonator 1, respectively for the resonator 2;

Power_reso1 and Power_reso2 correspond to the index of the received power given by the interrogation unit.

Table 1 below lists all the data obtained from the interrogation unit for each resonator and for different resonance frequencies of the antenna associated with the sensor.

The quality factors Q_1 and Q_2 are the quality factors of the two resonators and are representative of their frequency bandwidth fr_resol1/$\Delta$f and fr_resol2/$\Delta$f. The higher these quality factors are, the smaller the mid-height width becomes.

TABLE 1

| # Acquisition | Fr_antenna | Fr_reso1 | P_reso1 | Q_1 | Fr_reso2 | P_reso2 | Q_2 |
|---|---|---|---|---|---|---|---|
| ACQ001 | 301.6 | 433.6135411 | 2 | 7430 | 434.3826943 | 2 | 5187 |
| ACQ002 | 310.58 | 433.6141191 | 5 | 7926 | 434.3836148 | 3 | 5139 |
| ACQ003 | 319.56 | 433.6159531 | 1 | 8650 | 434.3850105 | 1 | 5478 |
| ACQ004 | 328.53 | 433.6182821 | 2 | 5319 | 434.3869932 | 2 | 5348 |
| ACQ005 | 337.51 | 433.620741 | 4 | 5660 | 434.3897185 | 4 | 5691 |
| ACQ006 | 346.49 | 433.6227145 | 5 | 3532 | 434.3921891 | 5 | 3541 |
| ACQ007 | 355.47 | 433.6267515 | 6 | 3460 | 434.3960006 | 5 | 3472 |
| ACQ008 | 364.44 | 433.6363957 | 8 | 2344 | 434.4058471 | 8 | 2352 |
| ACQ009 | 373.42 | 433.6529192 | 1 | 3346 | 434.4239706 | 1 | 1961 |
| ACQ010 | 382.4 | 433.7046978 | 1 | 1363 | 434.4855054 | 1 | 1365 |
| ACQ011 | 391.38 | 433.372663 | 1 | 1046 | 434.1985667 | 1 | 1067 |
| ACQ012 | 400.35 | 433.5279973 | 1 | 1380 | 434.3055715 | 1 | 1488 |
| ACQ013 | 409.33 | 433.5661504 | 1 | 3460 | 434.3374469 | 9 | 3747 |
| ACQ014 | 418.31 | 433.5740617 | 9 | 4579 | 434.3450286 | 8 | 4810 |
| ACQ015 | 427.29 | 433.5827963 | 6 | 4743 | 434.3525812 | 5 | 4930 |
| ACQ016 | 436.26 | 433.5871137 | 4 | 9646 | 434.3564237 | 3 | 9931 |
| ACQ017 | 445.24 | 433.5926757 | 3 | 9671 | 434.3604782 | 2 | 9918 |
| ACQ018 | 454.22 | 433.59452 | 2 | 8819 | 434.3625106 | 1 | 9026 |
| ACQ019 | 463.2 | 433.5952762 | 4 | 9384 | 434.363593 | 2 | 9460 |
| ACQ020 | 472.17 | 433.596497 | 2 | 9285 | 434.3648226 | 2 | 9296 |
| ACQ021 | 481.15 | 433.5986819 | 2 | 8493 | 434.3662842 | 2 | 8502 |

The device comprises:
- a differential passive sensor comprising two SAW resonators coupled to a sensor antenna placed at 2 cm from a ground plane;
- a reader antenna exhibiting, for example, an impedance with a real part of 50 ohms, and imaginary part equal to 0;

The distance between the reader antenna and the sensor antenna is 30 cm.

It can be deduced from Table 1 that the best results are obtained in terms of received power for antennas resonating at 409 MHz and at 418 MHz, in correlation with high quality factors.

The invention claimed is:

1. A method for optimizing the design of a device by selecting at least one curve $P_{SAW}$ from a set of curves $P_{SAW}$, the device comprising an interrogator, at least one differential passive sensor, and a set of sensor antennas connected to the at least one differential passive sensor, the interrogator comprising a reader antenna and a generator connected directly or indirectly to the reader antenna, the at least one differential passive sensor comprising at least two resonators, the method comprising:

determining the set of curves $P_{SAW}$ that correspond to a received power/transmitted power ratio as a function of a frequency of interrogation of the at least one differential passive sensor, for the reader antenna and the set of sensor antennas, each curve $P_{SAW}$ of the set of curves $P_{SAW}$ being defined for a given impedance $Z_T$ representing an impedance of the generator dependent on an impedance of the reader antenna, on an impedance of each sensor antenna of the set of sensor antennas, and on a respective coupling between the reader antenna and each sensor antenna of the set of sensor antennas, for a given sensor impedance $Z_{SAW}$;

selecting at least one curve $P_{SAW}$ from the set of curves $P_{SAW}$ the at least one curve $P_{SAW}$;

exhibiting two frequency peaks representative of a differential sensor; and having a width at mid-height of the two frequency peaks that is below a threshold value; and determining that a sensor antenna of the set of sensor antennas that exhibits a sensor antenna impedance correlated to the at least one curve $P_{SAW}$.

2. The method according to claim 1, wherein the set of curves $P_{SAW}$ are determined by using a quadripole as a matching circuit between the generator and the reader antenna, so as to increase the number of curves $P_{SAW}$ by varying the impedance of the reader antenna and the respective coupling between the reader antenna and each sensor antenna of the set of sensor antennas.

3. The method according to claim 1, wherein the threshold value of the mid-height width is approximately 100 kHz.

4. The method according to claim 1, wherein the at least two resonators are acoustic resonators, the acoustic resonators being surface wave resonators or volume wave resonators.

5. The method according to claim 1, wherein the at least two resonators are dielectric resonators.

6. The method according to claim 1, wherein the set of curves $P_{SAW}$ is generated for a set of operating temperatures of said device, the at least one passive differential sensor being a temperature sensor.

7. The method according to claim 1, wherein the at least one passive differential sensor is a strain/deformation sensor.

* * * * *